(12) United States Patent
Mousavi et al.

(10) Patent No.: US 7,464,155 B2
(45) Date of Patent: Dec. 9, 2008

(54) DEMOGRAPHIC INFORMATION ACQUISITION SYSTEM

(75) Inventors: Kianoosh Mousavi, Ottawa (CA); Jeff Joslin, Ottawa (CA)

(73) Assignee: Siemens Canada Ltd., Chatham, Ontario (CA)

( * ) Notice: Subject to any disclaimer, the term of this patent is extended or adjusted under 35 U.S.C. 154(b) by 739 days.

(21) Appl. No.: 10/395,496

(22) Filed: Mar. 24, 2003

(65) Prior Publication Data

US 2004/0249930 A1    Dec. 9, 2004

(51) Int. Cl.
*G06F 15/173* (2006.01)
(52) U.S. Cl. ...................................... 709/224
(58) Field of Classification Search ......... 709/223–224, 709/202–207; 455/456.1–457
See application file for complete search history.

(56) References Cited

U.S. PATENT DOCUMENTS

| | | | |
|---|---|---|---|
| 7,020,082 B2* | 3/2006 | Bhagavath et al. | 370/230 |
| 7,284,033 B2* | 10/2007 | Jhanji | 709/206 |
| 2003/0006911 A1* | 1/2003 | Smith et al. | 340/988 |
| 2003/0126250 A1* | 7/2003 | Jhanji | 709/223 |
| 2004/0210661 A1* | 10/2004 | Thompson | 709/228 |
| 2007/0287473 A1* | 12/2007 | Dupray | 455/456.1 |
| 2008/0071786 A1* | 3/2008 | Swanburg et al. | 707/9 |
| 2008/0109295 A1* | 5/2008 | McConochie et al. | 705/10 |

* cited by examiner

*Primary Examiner*—Saleh Najjar
*Assistant Examiner*—Asad M Nawaz

(57) ABSTRACT

Methods and systems for acquiring demographic information are disclosed. Demographic information is acquired from monitoring internet traffic. The demographic information is stored in a management server and analyzed to generate a demographic profile. Various business decisions, such as advertising, can be based on the demographic profile.

24 Claims, 8 Drawing Sheets

| 482 | 484 | 486 |
|---|---|---|
| Category | Weight Value | User |
|  |  |  |

480

| 372 | 374 | 376 | 378 |
|---|---|---|---|
| Time | Location | URL | Category |
|  |  |  |  |

| 482 | 484 | 486 |
|---|---|---|
| Category | Weight Value | User |
|  |  |  |

| Time | Number of Accesses | Duration | Location |
|------|--------------------|----------|----------|
|      |                    |          |          |

Fig. 5

| 661 | 662 | 663 | 664 | 665 |
|---|---|---|---|---|
| User ID | Gender | Age | Income | Occupation |
|  |  |  |  |  |

DEMOGRAPHIC INFORMATION ACQUISITION SYSTEM

FIELD OF THE INVENTION

The present invention relates to acquiring demographic information. More particularly, the invention relates to screening traffic in a network for acquiring demographic information.

BACKGROUND OF THE INVENTION

Over the years, demographic information has been used for a variety of purposes. For example, demographic information may be used to analyze and identify patterns in consumer behavior, which may be useful for various types of business decisions. Marketing or advertising may be directed to specific audiences that are likely to be interested in the goods or services advertised, based on their demographic profiles.

Demographic information characterizes a population within a certain area, and comprises information such as the age, income or ethnic group composition, or male/female ratio. Other types of information, such as preferences, interests and consumer behavior are also useful for various purposes. Conventionally, demographic information is obtained through population census, polls or surveys. The United States Census Bureau (USCB), among other similar international bodies and commercial enterprises, collect and distribute demographic information.

Demographic information is typically averaged over a long period of time and/or large area. Furthermore, the information tends to be static and does not take into account of short-term movement of people. As such, demographic information may not accurately characterize people at a geographical location. This may lead to incorrect or outdated business decisions.

From the foregoing discussion, it is desirable to gather and correlate demographic information which more accurately reflects or characterizes people within a geographical location.

SUMMARY OF THE INVENTION

The invention generally relates to acquiring demographic information. In one embodiment, the demographic information is acquired from monitoring internet traffic. In one embodiment, the demographic information is stored in a management server. The demographic information is analyzed to generate a demographic profile. Various business decisions can be based on the demographic profile. In one embodiment, adaptive advertising decisions are based on the demographic profile. Other types of business decisions are also useful. The adaptive advertising decision can be static and/or dynamic. Other advertising decisions, such as direct advertising, can also be based on the demographic profile.

BRIEF DESCRIPTION OF THE DRAWINGS

FIGS. 3-6 show information and arrangement of information acquired by the demographic system in accordance with various embodiments of the invention;

PREFERRED EMBODIMENTS OF THE INVENTION

The invention relates to a demographic acquisition system. In one embodiment, the demographic acquisition system (DAS) monitors and acquires demographic information from internet traffic. Preferably, the DAS monitors and acquires demographic information from internet traffic at desired locations. Demographic information can include, for example, age, income, ethnicity, and gender. Other types of demographic information are also useful. For example, information such as the types of sites accessed or other types information which evidence the interests of internet users are also useful. Such information can be used as the basis of various types of business decisions (e.g., marketing, product development, or determining business opportunities).

Figure 1:
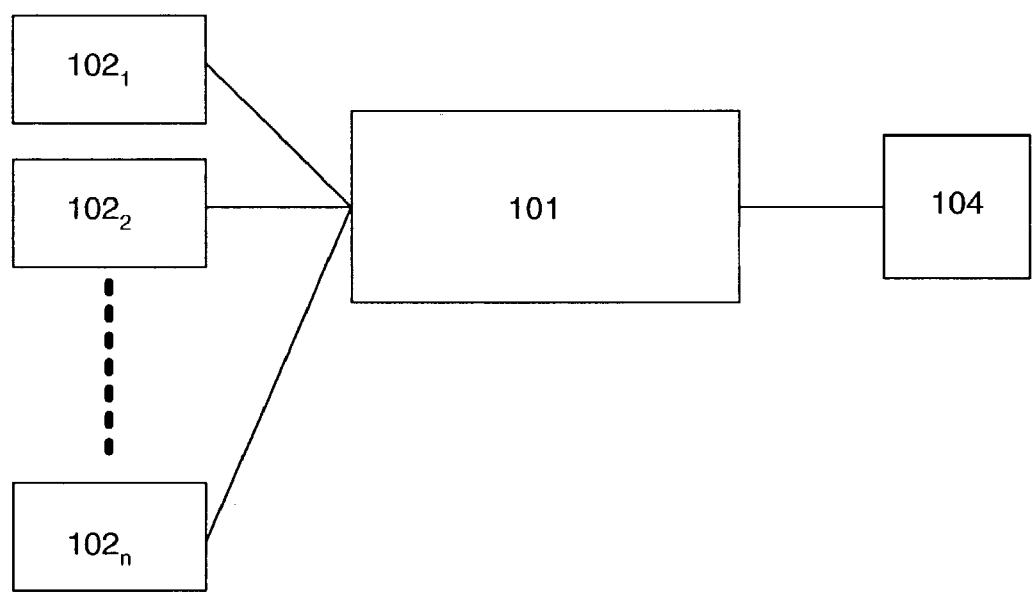
FIG. 1 shows one embodiment of the invention.

FIG. 1 shows a DAS 101 in accordance with one embodiment of the invention. The DAS system acquires demographic information from internet traffic. In one embodiment, the DAS system acquires demographic information from internet traffic associated with a plurality of location nodes $102_{1-n}$. As shown, the DAS is disposed between the location nodes and the internet. Providing a DAS which is coupled to the location nodes indirectly via the internet or as part of a location node is also useful.

A location node is a point of access to the internet 104. A plurality of users can access the internet from a location node. Access to the internet can be facilitated by communication devices, such as personal computers or laptops. Other types of communication devices, such as personal digital assistants or cell phones, are also useful. Mobile or ultra-mobile (e.g., hand held computers or mobile phones) communication devices which can be used to access a network are also useful. The communication devices, for example, can be interconnected using a network such as local area network (LAN) or wide area network (WAN). Other types of networks, including intranets, extranets, telecommunications networks or other networks over which electronic, digital and/or analog data may be transmitted, are also useful.

In one embodiment, the network comprises an Ethernet network. Other types of network technologies, such as token ring, ARCNET or Fiber Distributed Data Interface (i.e., FDDI), are also useful. Preferably, the network comprises a wireless network, wherein a mobile user can connect to the network through a wireless connection. Wireless connections, for example, include connections by radio frequencies. Other types of wireless connections, such as cellular communications or wireless fidelity (Wi-Fi®), are also useful. Providing a network implemented by a combination of both wired and wireless technologies is also useful. The use of wireless connections can enable a user to move seamlessly from one location node to another.

A location node can be static or dynamic. For example, a static location node includes a fixed location such as an office, store, library, or university while a dynamic location node can include a train or a bus. In another embodiment, a location node can be a hybrid location node (i.e., both static and dynamic). A hybrid location node, for example, includes a base station that can be located in a fixed location while one or more mobile units connect back to the base station using wireless connections. Various types of wireless connects can be employed to provide the connections between the mobile units and base station. The mobile units, for example, comprise transports such as buses or trains. Other types of mobile units are also useful.

As described, a location node comprises a plurality of users interconnected by a network. Providing a location node comprising a single user is also useful. Alternatively, a plurality of nodes can be grouped together to represent a geographical region, such as a city block or greater (e.g., city section, city, state, etc.). A group of nodes can be collectively referred to as a node.

Figure 2:
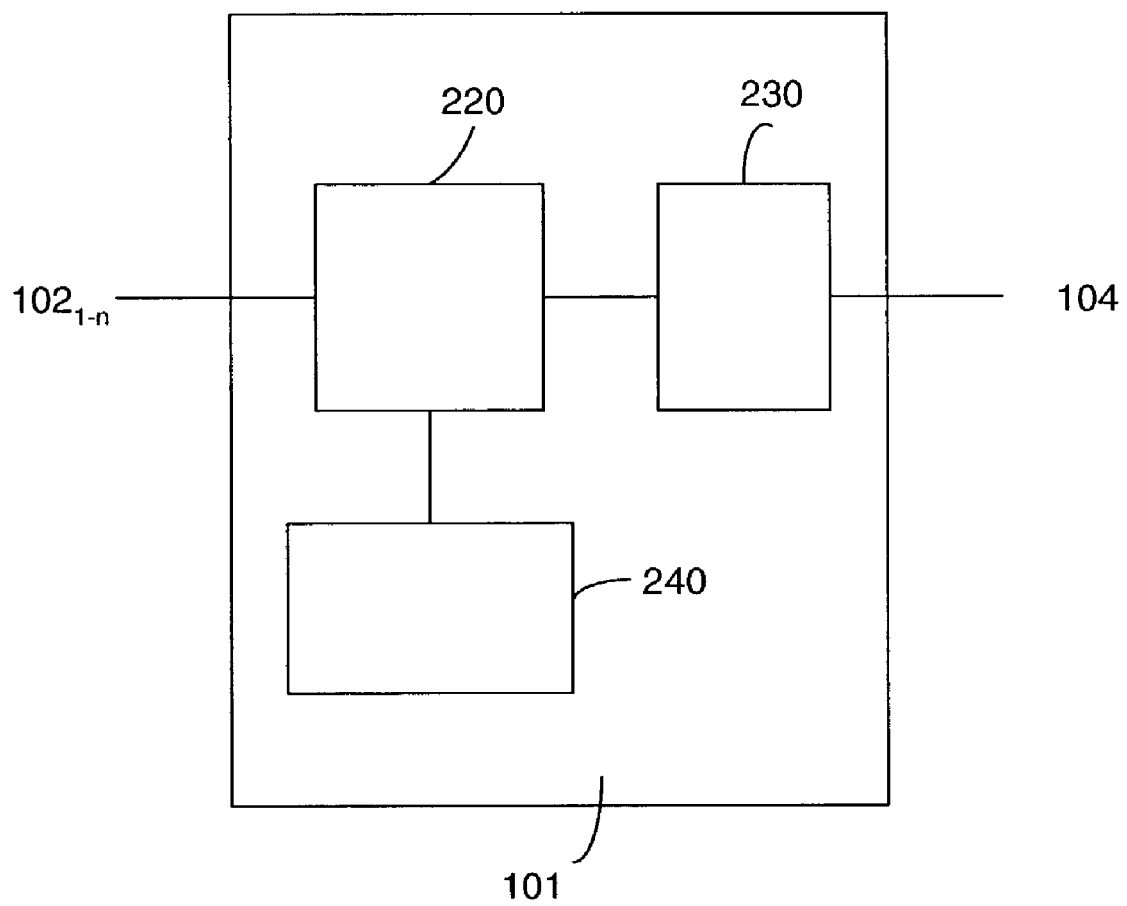
FIG. 2 shows a demographic acquisition system in accordance with one embodiment of the invention.

FIG. 2 shows a DAS in accordance with one embodiment of the invention. As shown, the DAS comprises a network switch 220, a router 230, and a management server 240. The network switch, for example, comprises an Ethernet switch. Other types of network switches are also useful. In one embodiment, the network switch is coupled to the location nodes $102_{1-n}$ and internet 104 via the router. The management server is coupled to the switch. The network switch receives information (outgoing node information or outgoing traffic) from the location nodes. The information is forwarded to the internet via the router. Information from the internet to a desired node location (incoming node information or incoming traffic) is received by the switch via the router and forwarded to the desired location node. The router determines the best routes to forward the data toward its destination, based on network conditions. Integrating the router as part of the network switch is also useful.

Alternatively, the network switch can be coupled directly to the internet. The network switch extracts information from the location nodes indirectly via the internet. This can be achieved by, for example, modifying the switch to forward or copy the desired packets to the DAS along with the desired information (e.g., time and location information). This will allow decoupling the DAS from the location nodes. In yet another embodiment, some nodes can be coupled to the DAS while others are indirectly coupled via the internet.

The management server 240 acquires demographic information by monitoring internet traffic between the location nodes and the internet. Although the management server is shown as a single component, it is understood that it can include additional components, such as storage, databases, as well as processors. In a preferred embodiment, the management server includes a neural network or other artificial intelligence architecture to accommodate fast and intelligent decision making. The management server can also be interconnected to other components or systems. In one embodiment, outgoing traffic is monitored by the management server. Monitoring both outgoing and incoming traffic can also be useful.

In one embodiment, information associated with the internet traffic is stored in a profile database. The profile database, for example, can be located on the management server. Locating the database separate from the management server is also useful. Various demographic information associated with the internet traffic is stored in the profile database. In one embodiment, as shown in FIG. 3, the profile database comprises data 370 associated with time stamp 372 of sites accessed, location identifier 374 indicating from which location node the sites were accessed, and uniform resource locator (URL) 376 identifying at what time the accesses were initiated. Other information, such as search strings, can also be included.

In a preferred embodiment, a category identifier 378 is associated with the URL and/or search string. For example, if a URL relates to automobiles (e.g., manufacturer, model, accessories), it can be categorized generally as automobile. Preferably, a category identifier can include one or more sub-category identifiers. For example, the general category of automobile can be subcategorized to include sports car, luxury cars, foreign, price range, and/or accessories.

Figure 4:
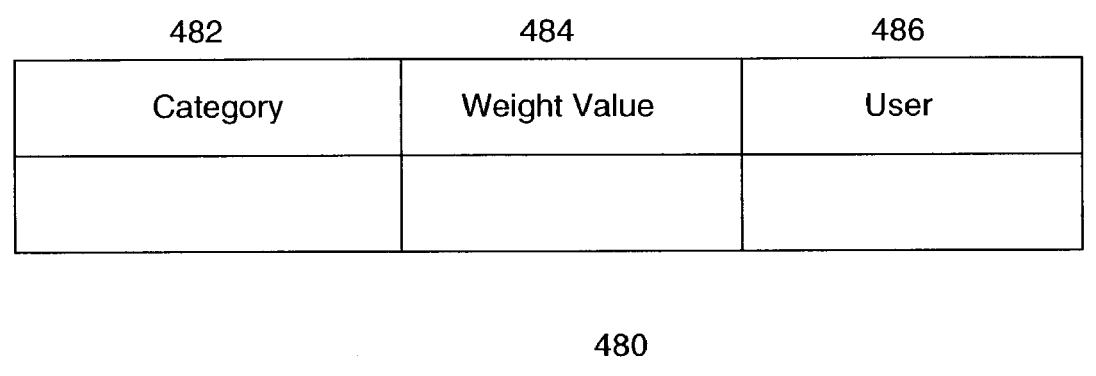

In another embodiment, statistical analysis can be performed on the information acquired and stored in the profile database. In one embodiment, a category table 480 as shown in FIG. 4 can be provided. The category table assigns a weighting factor 484 to the categories 482 of URLs and/or search strings. For example, the weight factor can have a value from 1-10. The higher the value, the more important the category is. In a preferred embodiment, the categories can be segmented by time frames (e.g., morning, afternoon, evening, etc.). Each time frame can be associated with a weight factor. This enables a more accurate characterization of a location by taking into consideration the movements of people within a day.

The weight factor can be stored in, for example, a weight factor table 590, as shown in FIG. 5. In one embodiment, the weight factor takes into consideration of number of accesses 592 to the sites related to the category, time and/or date of the accesses 594, and duration of the accesses 596. The location 598 of the accesses can also be considered when calculating the weight value. Other techniques for indicating the relative importance of a category over others or determining weight values are also useful.

User information can also be acquired by the management server and stored in a user table 660, as shown in FIG. 6. The user information includes, for example, user identification 661, gender 662, age 663, income level 664 and profession/occupation 665. Other types of user information, such as ethic group, education level, religion, interests and/or preferences can also be included. The user identification can be derived from, for example, internet protocol (IP) address, mobile IP address, or media access control (MAC) address. In one embodiment, user identification information 486 is also included in the category 480 table of FIG. 4.

User information can be obtained from, for example, internet service providers (ISPs) to which users subscribe. Other techniques of obtaining user profile information are also useful. For example, surveys (electronic or non-electronic) or contests can be used. Also, a user may be asked to submit an application with personal information when using the network at the location node or nodes. The DAS may then issue a user id number associated to the application. Upon each access, the user would need to log in and traffic associated with the user can easily be tracked.

The location of the user can be determined by, for example, IP addresses. For dynamic or hybrid (fixed/dynamic) nodes, the location can be determined using various techniques, such as triangulation calculation, MAC tracking, or Mobile IP. Other techniques, such as LCS (Location Services), are also useful. By being able to track mobile users (e.g., from one location node to another or location of a mobile node), information related to which nodes or locations were traversed by a user can be determined. For example, 50% of the travelers on a specific train end up in Java coffee shop after disembarkation from a certain station.

In one embodiment, user information acquired is used to create a user profile database. The user profile database can be part of the user table or separate therefrom. The user profile database can be updated with information acquired from the internet traffic. For example, an internet transaction can be correlated with its respective user. Information from the internet traffic can then be updated into the user profile, such as sites visited, or time of access.

The various tables can be integrated as part of the profile database. Providing tables (one, some or all) which are separate from the profile database is also useful. Additionally, other types of information (in lieu or in addition to those described) can be acquired and stored in the profile database. The information acquired can also be stored or arranged using other types of tables, facilitating analysis of such data.

The DAS facilitates continuous acquisition of demographic data. The data, as acquired, are stored in the management server. In one embodiment, the management server includes an artificial intelligence architecture (e.g., neural network, pattern recognition or fuzzy logic). The artificial intelligence architecture serves to categorize and correlate data as well as updating of the database. Furthermore, the artificial intelligent architecture can be used to develop demographic profiles for the location nodes. The DAS allows the demographic profiles to be updated based on internet traffic. This enables the development of demographic profiles which more accurately reflect or characterize people within a geographical location. For example, location profiles can be developed based on various times of the day, days of the week, months of the year. Other granularities (both temporal and geographical) can also be useful. Additionally, the profiles can also include information related to traversal of locations. This is particularly useful to track movement of people.

As described, the DAS advantageously enables continuous acquisition of data and updating of the demographic profiles. The ensures that business decisions from demographic profiles are based on current information.

In an alternative embodiment, the DAS acquires the data, which are then manually analyzed to update user profiles and/or update demographic profiles. Providing a combination of manual and automated (e.g., computerized) analysis of the data and updating of user and/or demographic profiles is also useful.

Figure 7A:
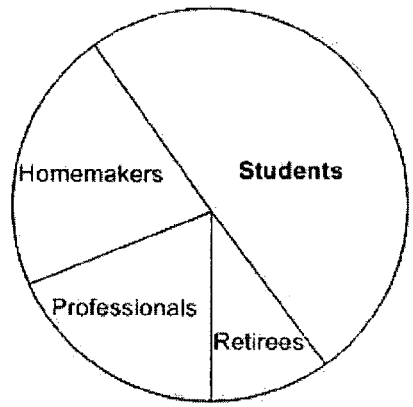
FIGS. 7a-d show examples of demographic profiles of a location node segmented into time frames.
Figure 7B:
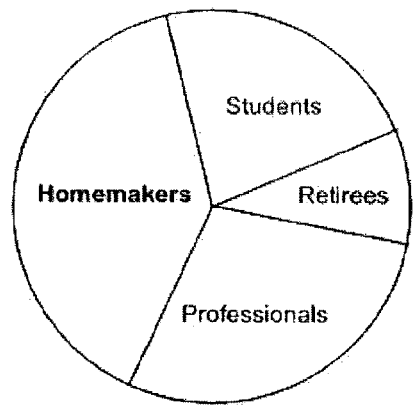
Figure 7C:
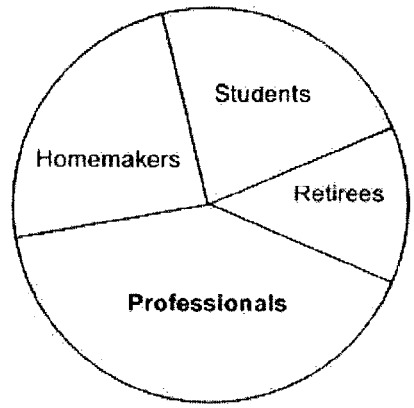
Figure 7D:
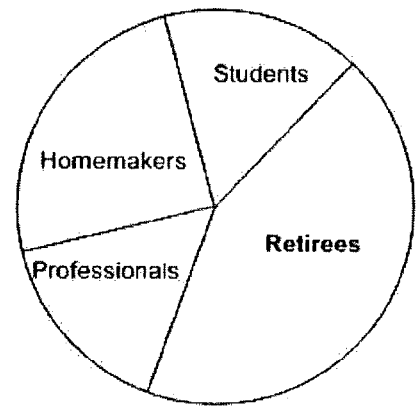

FIGS. 7a-d show an example of a demographic profile that may be created from the user information. The users may be categorized into different groups based on, for example, gender, occupation, age, income level, interests or other suitable criteria. Other types of demographic profiles are also useful. The different pie charts represent the demographic profiles during different time intervals. FIG. 7a shows that the majority of users at the location node during time 8:00 to 10:00 h are students. The students may have similar interests, which can be acquired by monitoring the data traffic and updating the database. If, for example, the students are interested in the latest fashion, advertisements promoting the latest fashion may be displayed on billboards or brochures may be distributed within the location node during that time period. During time 12:00-14:00 h, the majority of the users comprises professionals, as shown in FIG. 7c. FIGS. 7b and 7d show different profiles during other time segments. The demographic profiles can also include types (e.g., categories) of sites visited during different time segments of the day.

Other types of demographic information may also be derived from the user information, depending on the application. In one embodiment, the mobility of the users between the location nodes is analyzed. For example, 40% of the users from location node A may end up at location node B.

The demographic information acquired and profiles developed reveal or identify trends related to particularly locations. Such information can be used for various types of applications. For example, such information can be used to determine advertising decisions or influence business decisions, such as what products to sell or develop for particularly locations, new business opportunities, or business partnerships. Other applications include, for example, sale of demographic information.

In one embodiment, advertising strategies and systems are developed based on the demographic information. In one embodiment, advertising strategies and systems comprise static advertising strategies and systems. Adaptive static advertising comprises adapting or tailoring the subject matter of the advertisement to the location profile. Preferably, the adaptive static advertising takes into account the time frame of the As an example of adaptive static advertising, assume that at location A, it is identified that there is a significant interest in high-end sports cars during time segment between 11:00 am to 1:00 pm on Wednesdays. This information can be presented to interested parties, such as high-end sports car dealers and manufacturers. Interested parties would than display advertisement related to high-end sports cars during the corresponding time frame at location A.

In another embodiment, adaptive dynamic advertising strategies and systems are developed from the demographic information acquired. Adaptive static advertising strategy comprises adapting or tailoring the subject matter of the advertisement to the demography of the location in real time. For example, if the DAS determines that a category is being or has been accessed by n users (e.g., n is a whole number which is greater than or equal to a predetermined threshold number), advertisement related to that category can be displayed. In the event that the threshold is not satisfied, the adaptive system can display advertisements related to categories that are currently accessed by users. In one embodiment, the display comprises an intelligent display (wired or wireless). Other types of displays are also useful. The display can be integrated as part of or separate from the location node. The adaptive dynamic location profile. The time frame, for example, can be a time segment of a day or a time segment of a specific day of the week. Other temporal granularities are also useful. Interested parties can place advertisements in accordance with the trend identified by the location profile. The corresponding time frame can be sub-divided into time slots for different interested parties to place advertisements. Alternatively, the time frame can be sub-divided into time slots in the event more than one category have been identified as having high interest at the location.

In one embodiment, the advertisement can be displayed on an intelligent display. The intelligent display preferably comprises a wireless intelligent display. The use of wired intelligent displays is also useful. In one embodiment, the display can be integrated as part of a location node. Alternatively, the display is a separate node located in or near the location node. Advertisements can be displayed on the intelligent display. The use of intelligent displays facilitates adaptive static advertising since advertisement can easily be changed according to the location profile. Other types of displays or advertising media, such as static or dynamic billboards, posters or brochures, are also useful.

advertising strategy can be based on the location profile. For example, the location profile identifies categories of interests. Interested parties can then place advertisements at the location.

In another embodiment, the DAS can be used to implement directed advertisement strategy. For example, when a user accessed a site, the DAS directs an advertisement, such as a pop-up advertisement to the user's computer or access device. Alternatively, advertisements based on the user's profile can be directed to the user when the DAS identifies that the user is on-line.

In one embodiment, the various advertising strategies and systems can be combined. Combining advertising strategies can improve the effectiveness of advertisement. The DAS can also be employed to acquire information which is used to measure the effectiveness of the advertisement (e.g., advertisement efficiency factor). For example, the DAS can acquire information which identifies that out of 100 people at location X who are shown an advertisement for retailer, 85 visits that retailer. This shows 85% efficiency for that advertisement. Also when coupled with user information, it can determine that a certain percentage of those people actually made purchases at the retailer. Other information, such as the amount of the purchase as well as what was purchased, can also be included to help identify the effectiveness of the advertising strategy. For example, of the people shown the advertisement and made purchases, 34% bought the item featured in the ad, 30% bought more expensive items, and 74% spent at least $50 at the store. Such information can be used to influence business strategies, such as pricing.

Figure 8:
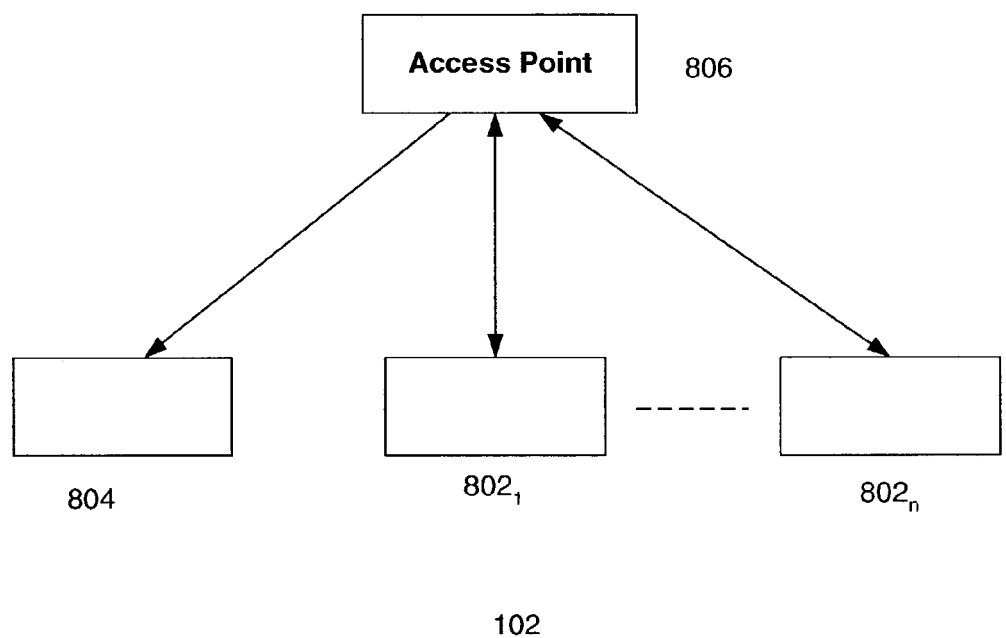
FIG. 8 shows a location node in accordance with one embodiment of the invention.

FIG. 8 shows one embodiment of the location node. The location node comprises, for example, a plurality of communication devices $802_{1-n}$ connected to an access point 806. The communication devices include, for example, electronic devices such as personal computers, laptops, personal digital assistants or cell phones. The connection to the access point can be wired, wireless, or a combination of both. The access point enables the communication devices to access the internet, either directly or indirectly through the DAS.

The location node also includes a display 804. The display, in one embodiment, comprises an intelligent display. Other types of displays are also useful. The display can be coupled to the access point using a wired or a wireless connection. The display facilitates adaptive dynamic and/or static advertising strategies. Alternatively, the display is separate from the location node.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. A method for acquiring demographic information for a geographic location comprising:
    monitoring internet traffic for the geographic location;
    storing information related to the internet traffic;
    analyzing the information utilizing an artificial intelligence architecture to generate a demographic profile for the geographic location, the artificial intelligence architecture including at least one of a neural network, pattern recognition, and fuzzy logic;
    selecting at least one internet transaction of a user that occurred during a first temporal period from the internet traffic, the first temporal period including at least one of a day, a portion of the day, a week, a portion of the week, a month, and a portion of the month;
    assigning at least one category to the at least one internet transaction and a weight to at least one category for the first temporal period;
    determining movement of the user between the geographic location and an additional geographic location by monitoring internet traffic for the user at the additional geographic location occurring during a second temporal period; and
    displaying content at the geographic location at a time based on said demographic profile for the geographic location, the weight of the at least one category, and comparison of time to the first temporal period and second temporal period.

2. The method of claim 1, wherein monitoring internet traffic comprises monitoring internet traffic from at least one location node.

3. The method of claim 2, wherein each location node comprises at least one communication device for communicating with the internet.

4. The method of claim 3, wherein the communication devices communicate with the internet via a aired or wireless connection.

5. The method of claim 2 wherein each location node comprises a static location node, a dynamic location node or a hybrid location node.

6. The method of claim 1 wherein the analyzing the information generates demographic profiles for the location nodes.

7. The method of claim 6 further comprises forming business decisions based on the information.

8. The method of claim 7 wherein the business decisions comprise adaptive static advertising, adaptive dynamic advertising, direct advertising, or a combination thereof.

9. The method of claim 1 further comprises forming business decisions based on the information.

10. The method of claim 9 wherein the business decisions comprises adaptive static advertising, adaptive dynamic advertising, direct advertising, or a combination thereof.

11. The method of claim 1 further comprises:
    acquiring user information of users to generate a user profile; and
    correlating the user information with information from monitoring internet traffic to generate a demographic profile.

12. The method of claim 11 wherein the analyzing the information generates demographic profiles for the location nodes.

13. The method of claim 12 further comprises forming business decisions based on the information.

14. The method of claim 13 wherein the business decisions comprise adaptive static advertising, adaptive dynamic advertising, direct advertising, or a combination thereof.

15. The method of claim 11 further comprises forming business decisions based on the information.

16. The method of claim 15 wherein the business decisions comprises adaptive static advertising, adaptive dynamic advertising, direct advertising, or a combination thereof.

17. The method as claimed in claim 1, wherein said content is an advertisement.

18. The method as claimed in claim 17, wherein said advertisement is based upon a category accessed by a threshold number of users.

19. A demographic acquisition system for a geographic location having a management server comprising:
    processor for monitoring internet traffic for a geographic location including at least one internet transaction of a user that occurred during a first temporal period, the first temporal period including at least one of a day, a portion of the day, a week, a portion of the week, a month, and a portion of the month;
    memory for storing information related to the internet traffic for analysis;
    a communication link for receiving information about monitored internet traffic for the user at an additional geographic location during a second temporal period;
    an artificial intelligence architecture analyzing the internet traffic to generate a demographic profile for the geographic location, assign at least one category to the at least one internet transaction and a weight to the at least one category for the first temporal period, and determine movement of the user between the geographic location and the additional geographic location by comparing the first temporal period and the second temporal period; and a display, said display being operably connected to said processor and located in said geographic location, said display for displaying content, wherein the display displays content at a time based on the demographic profile for the geographic location, the weight of the at least one category, and the movement of the user.

20. The method as claimed in claim 19, wherein said content is an advertisement.

21. The method as claimed in claim 20, wherein said advertisement is based upon a category accessed by a threshold number of users.

22. A method of generating a demographic profile for a geographic location comprising:
monitoring internet traffic for the geographic location;
storing information related to the internet traffic;
analyzing the information to generate the demographic profile for the geographic location;
selecting at least one internet transaction of a user that occurred during a first temporal period from the internet traffic, the first temporal period including at least one of a day, a portion of the day, a week, a portion of the week, a month, and a portion of the month;
assigning at least one category to the at least one internet transaction and a weight to the at least one category for the first temporal period;
determining movement of the user between the geographic location and an additional geographic location by monitoring internet traffic for the user at the additional geographic location occurring during a second temporal period; and
displaying content at the geographic location at a time based on said demographic profile for the geographic location and comparison of the time to the first temporal period and second temporal period.

23. The method as claimed in claim 22, wherein said content is an advertisement.

24. The method as claimed in claim 23, wherein said advertisement is based upon a category accessed by a threshold number of users.

* * * * *